United States Patent
Fan et al.

(10) Patent No.: US 9,551,878 B2
(45) Date of Patent: Jan. 24, 2017

(54) PATTERNED RETARDER FILM AND DISPLAY APPARATUS

(71) Applicant: SHENZHEN CHINA STAR OPTOELECTRONICS TECHNOLOGY CO., LTD., Shenzhen (CN)

(72) Inventors: Deyong Fan, Shenzhen (CN); Qiaosheng Liao, Shenzhen (CN)

(73) Assignee: SHENZHEN CHINA STAR OPTOELECTRONICS TECHNOLOGY CO., LTD, Shenzhen (CN)

( * ) Notice: Subject to any disclaimer, the term of this patent is extended or adjusted under 35 U.S.C. 154(b) by 66 days.

(21) Appl. No.: 14/233,773

(22) PCT Filed: Dec. 19, 2013

(86) PCT No.: PCT/CN2013/089928
§ 371 (c)(1),
(2) Date: Jan. 20, 2014

(87) PCT Pub. No.: WO2015/089779
PCT Pub. Date: Jun. 25, 2015

(65) Prior Publication Data
US 2015/0168736 A1 Jun. 18, 2015

(30) Foreign Application Priority Data
Dec. 17, 2013 (CN) .......................... 2013 1 0693306

(51) Int. Cl.
G02B 27/22 (2006.01)
G02B 27/26 (2006.01)
G02B 5/30 (2006.01)

(52) U.S. Cl.
CPC ............. *G02B 27/26* (2013.01); *G02B 5/3083* (2013.01)

(58) Field of Classification Search
CPC ............ H04N 13/0438; H04N 13/0497; H04N 13/0452; H04N 13/0029; H04N 13/0033; H04N 13/0434; H04N 7/087; H04N 13/0409; H04N 5/64; H04N 9/3129; H04N 9/3141; H04N 9/3147; H04N 9/3197; H04N 13/0404; H04N 13/0055; G09G 3/003; G02B 27/2214; G02B 27/26; G02B 5/3083
(Continued)

(56) References Cited

U.S. PATENT DOCUMENTS 7,697,203 B2 * 4/2010 Cha ................... H04N 13/0454
348/56
2011/0216277 A1 9/2011 Chen et al.
(Continued)

FOREIGN PATENT DOCUMENTS

| CN | 102193248 A | 9/2011 |
| CN | 102681236 A | 9/2012 |
| CN | 102778777 A * | 11/2012 |

*Primary Examiner* — Bumsuk Won
*Assistant Examiner* — Henry Duong
(74) *Attorney, Agent, or Firm* — Mark M. Friedman

(57) ABSTRACT

The present invention provides a patterned retarder film and a display apparatus. The patterned retarder film is attached to a display panel of the display apparatus. The display panel comprises first, second and third sub-pixels arranged along a first direction, and the patterned retarder film comprises at least two phase retarders. First saw portions and second saw portions are disposed at two opposite sides of the phase retarders and adjacent to at least one of the first, second and third sub-pixels. In the present invention, the color shift problem can be prevented.

17 Claims, 3 Drawing Sheets

(58) Field of Classification Search
USPC ......... 359/462–477; 348/42–60; 35/462–477
See application file for complete search history.

(56) References Cited

U.S. PATENT DOCUMENTS

| | | | |
|---|---|---|---|
| 2012/0013606 A1* | 1/2012 | Tsai | G02B 27/2214 345/419 |
| 2012/0262638 A1* | 10/2012 | Chen | G02B 5/201 349/15 |
| 2013/0033747 A1 | 2/2013 | Huang et al. | |
| 2013/0293794 A1 | 11/2013 | Hsiao | |
| 2014/0355115 A1* | 12/2014 | Wu | G02B 5/3083 359/489.07 |

* cited by examiner

PATTERNED RETARDER FILM AND DISPLAY APPARATUS

FIELD OF THE INVENTION

The present invention relates to a display technical field, and more particularly to a patterned retarder film and a display apparatus.

BACKGROUND OF THE INVENTION

In the conventional display technology, when using a film-type patterned retarder film to display 3D images, a conventional patterned retarder film 20 is disposed at a light emitting side of a display panel 10.

Light rays emitting from display panel 10 and passed through a polarized film on a color filter (CF) substrate are transformed into linearly polarized rays. The linearly polarized rays passed through the patterned retarder film 20 are transformed into right handed circularly polarized rays and left handed circularly polarized rays.

When passing through a user's circular polarizer glasses, the right handed circularly polarized rays and left handed circularly polarized rays pass through a right eye glass and a left eye glass, respectively. Thus, the user can view right eye images and left eye images.

As shown in FIG. 1, the conventional patterned retarder film 20 includes at least two retarders 201, 202 in a rectangular strip shape. The at least two retarders are arranged in parallel. A boundary line 203 positioned between at least two retarders is formed between two sub-pixels of the display panel 10. For example, in the display panel 10, blue sub-pixels are positioned at one side of red sub-pixels, and the boundary line 203 is positioned between the blue sub-pixels and the red sub-pixels.

In practice, there are the following problems existing in the conventional technology.

As shown in FIG. 2, in the above-mentioned 3D display technology, the blue sub-pixels are positioned at an upper side of the boundary line 203, and the red sub-pixels are positioned at a lower side of the boundary line 203. Accordingly, the images viewed at an upper viewing angle are reddish, and the images viewed at a lower viewing angle are bluish, thereby resulting in a color shift problem.

As a result, it is necessary to provide a new technology to solve the problems existing in the conventional technologies, as described above.

SUMMARY OF THE INVENTION

The present invention provides a patterned retarder film and a display apparatus, so as to prevent the color shift problem as well as improve a 3D display quality.

A primary object of the present invention is to provide a patterned retarder film for being attached to a display panel, wherein the display panel comprises at least two of the first sub-pixels, at least two of the second sub-pixels and at least two of the third sub-pixels, and the at least two of the first sub-pixels, at least two of the second sub-pixels and at least two of the third sub-pixels are arranged along a first direction, and the patterned retarder film comprises: a patterned retarder film body, comprising at least two phase retarders, wherein the at least two phase retarders are arranged along the first direction, and the phase retarders include first saw portions and second saw portions, and the first saw portions and the second saw portions are disposed at two opposite sides of the phase retarders, and a shape of the first saw portions correspond to a shape of the second saw portions; wherein the first saw portions and the second saw portions are adjacent to at least one of the first sub-pixels, at least one of the second sub-pixels and at least one of the third sub-pixels; wherein adjacent two of the phase retarders are a positive quarter phase retarder and a negative quarter phase retarder, wherein each adjacent two of the phase retarders are connected to each other.

In the above-mentioned patterned retarder film, a first edge of the first saw portions and a second edge of the second saw portions are arranged in a stepped shape.

In the above-mentioned patterned retarder film, at least two steps are formed on the first edge and the second edge, and the steps correspond to at least one of the first sub-pixels, the second sub-pixels and the third sub-pixels.

In the above-mentioned patterned retarder film, a gap is formed between each two of the first sub-pixels, the second sub-pixels and the third sub-pixels, and the first edge and the second edge can be positioned in the gap.

In the above-mentioned patterned retarder film, a height of the steps is continuously incremented or continuously decremented along a direction perpendicular to the first direction, and the height of the steps is periodically incremented or decremented.

In the above-mentioned patterned retarder film, a height of the steps is leaping incremented or leaping decremented along a direction perpendicular to the first direction, and the height of the steps s periodically incremented or decremented.

Another object of the present invention is to provide a patterned retarder film for being attached to a display panel, wherein the display panel comprises at least two of the first sub-pixels, at least two of the second sub-pixels and at least two of the third sub-pixels, and the at least two of the first sub-pixels, at least two of the second sub-pixels and at least two of the third sub-pixels are arranged along a first direction, and the patterned retarder film comprises: a patterned retarder film body, comprising at least two phase retarders, wherein the at least two phase retarders are arranged along the first direction, and the phase retarders include first saw portions and second saw portions, and the first saw portions and the second saw portions are disposed at two opposite sides of the phase retarders, and a shape of the first saw portions correspond to a shape of the second saw portions; wherein the first saw portions and the second saw portions are adjacent to at least one of the first sub-pixels, at least one of the second sub-pixels and at least one of the third sub-pixels.

In the above-mentioned patterned retarder film, adjacent two of the phase retarders are a positive quarter phase retarder and a negative quarter phase retarder.

In the above-mentioned patterned retarder film, a first edge of the first saw portions and a second edge of the second saw portions are arranged in a stepped shape.

In the above-mentioned patterned retarder film, at least two steps are formed on the first edge and the second edge, and the steps correspond to at least one of the first sub-pixels, the second sub-pixels and the third sub-pixels.

In the above-mentioned patterned retarder film, a gap is formed between each two of the first sub-pixels, the second sub-pixels and the third sub-pixels, and the first edge and the second edge can be positioned in the gap.

In the above-mentioned patterned retarder film, a height of the steps is continuously incremented or continuously decremented along a direction perpendicular to the first direction, and the height of the steps is periodically incremented or decremented.

In the above-mentioned patterned retarder film, a height of the steps is leaping incremented or leaping decremented along a direction perpendicular to the first direction, and the height of the steps is periodically incremented or decremented.

Still another object of the present invention is to provide a display apparatus, comprising: a display panel and a patterned retarder film attached to the display panel; wherein the display panel comprises at least two of the first sub-pixels, at least two of the second sub-pixels and at least two of the third sub-pixels, and the at least two of the first sub-pixels, at least two of the second sub-pixels and at least two of the third sub-pixels are arranged along a first direction, and the patterned retarder film comprises: a patterned retarder film body, comprising at least two phase retarders, wherein the at least two phase retarders are arranged along the first direction, and the phase retarders include first saw portions and second saw portions, and the first saw portions and the second saw portions are disposed at two opposite sides of the phase retarders, and a shape of the first saw portions correspond to a shape of the second saw portions; wherein the first saw portions and the second saw portions are adjacent to at least one of the first sub-pixels, at least one of the second sub-pixels and at least one of the third sub-pixels.

In the above-mentioned display apparatus, adjacent two of the phase retarders are a positive quarter phase retarder and a negative quarter phase retarder.

In the above-mentioned display apparatus, a first edge of the first saw portions and a second edge of the second saw portions are arranged in a stepped shape.

In the above-mentioned display apparatus, at least two steps are formed on the first edge and the second edge, and the steps correspond to at least one of the first sub-pixels, the second sub-pixels and the third sub-pixels.

In the above-mentioned display apparatus, a gap is formed between each two of the first sub-pixels, the second sub-pixels and the third sub-pixels, and the first edge and the second edge can be positioned in the gap.

In the above-mentioned display apparatus, a height of the steps is continuously incremented or continuously decremented along a direction perpendicular to the first direction, and the height of the steps is periodically incremented or decremented.

In the above-mentioned display apparatus, a height of the steps is leaping incremented or leaping decremented along a direction perpendicular to the first direction, and the height of the steps is periodically incremented or decremented.

In comparison with the conventional technology, the patterned retarder film and the display apparatus of the present invention can prevent the color shift problem as well as improve a 3D display quality.

The structure and the technical means adopted by the present invention to achieve the above-mentioned and other objects can be best understood by referring to the following detailed description of the preferred embodiments and the accompanying drawings.

DETAILED DESCRIPTION OF THE PREFERRED EMBODIMENTS

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

Figure 1:
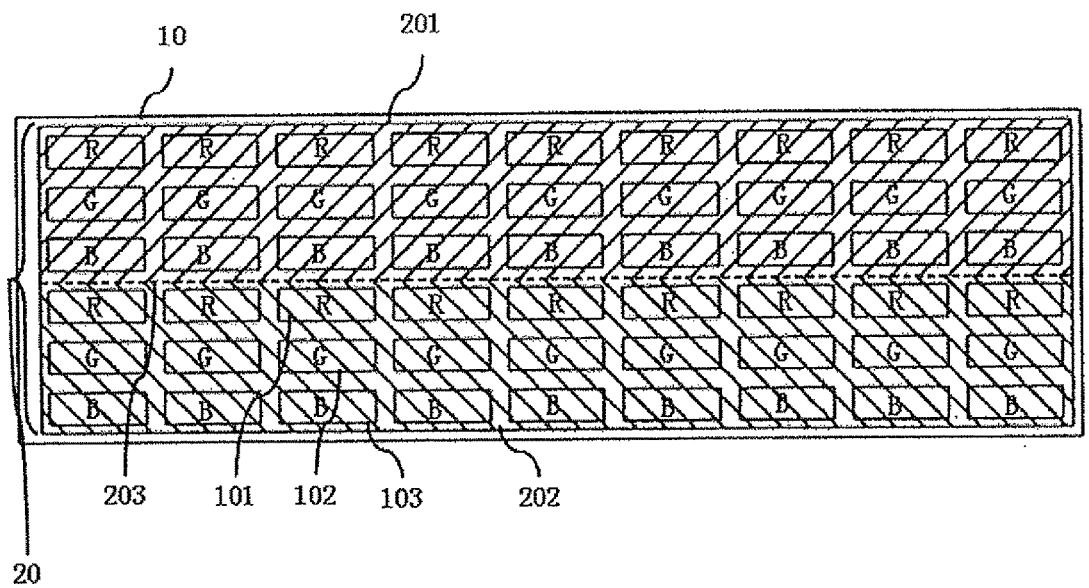
FIG. 1 is a schematic diagram showing a conventional display.
Figure 2:
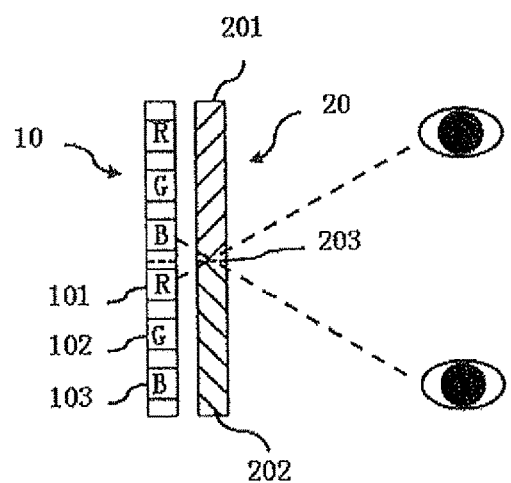
FIG. 2 is a schematic diagram showing a color shift problem of the conventional display in FIG. 1.
Figure 3:
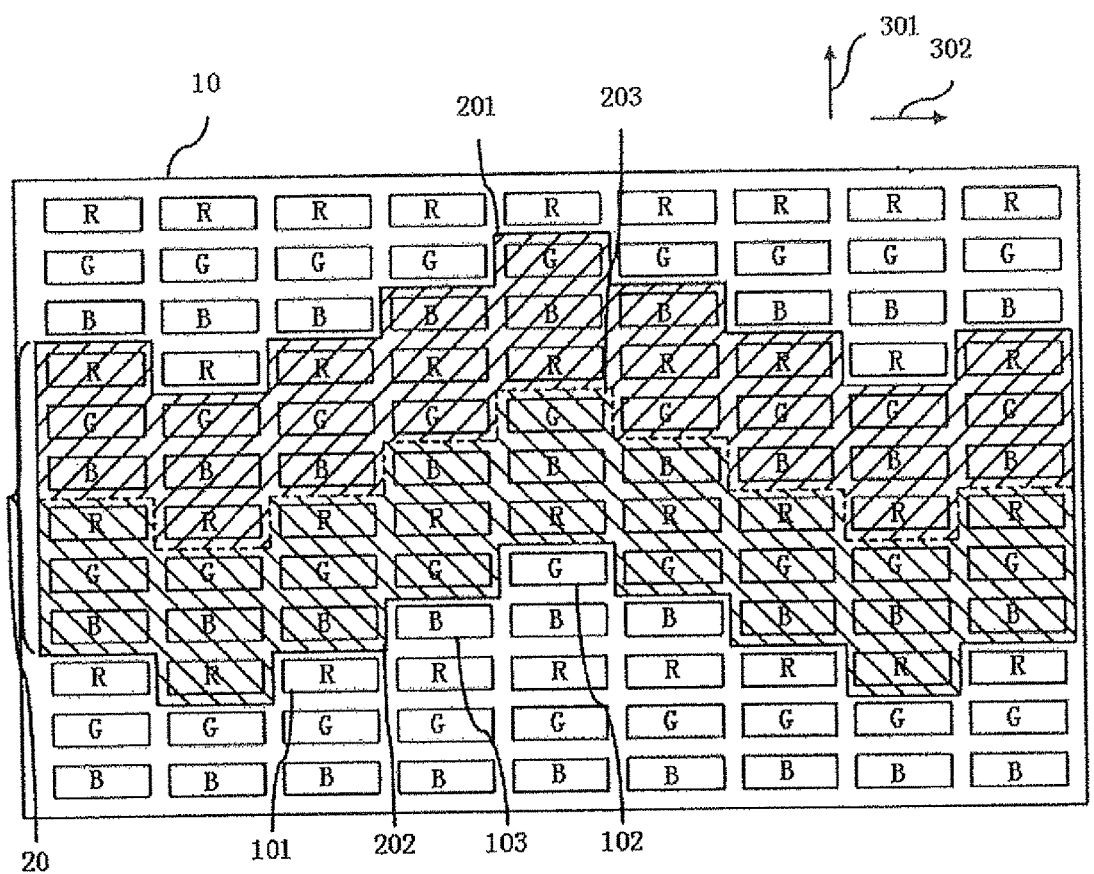
FIG. 3 is a schematic diagram showing a display apparatus according to a first embodiment of the present invention.

Referring to FIG. 3, a schematic diagram showing a display apparatus according to a first embodiment of the present invention is illustrated. The display apparatus of the present embodiment comprises a display panel 10 and a patterned retarder film 20, and the patterned retarder film 20 is attached to the display panel 10. The display panel 10 comprises at least two of the first sub-pixels 101, at least two of the second sub-pixels 102 and at least two of the third sub-pixels 103. The display panel 10 may be a liquid crystal display (LCD) panel or an organic light emitting diode (OLED) panel. The display apparatus of the present invention may be configured to display 2D images or 3D images, and further may be a 2D/3D switch-able display.

In this embodiment, pixels of the display panel 10 may be arranged as tri-gate structures. That is, the first sub-pixels 101, the second sub-pixels 102 and the third sub-pixels 103 can be arranged along a first direction 301 for reducing a number of data lines of the display panel 10, thereby reducing a number of data signal processing chips (source IC chips). In this case, a number of gate lines/scan line and a number of scan signal processing chips (gate IC chips) are increase. However, a cost of the data signal processing chip is higher than a cost of the scan signal processing chips. Therefore, by using the tri-gate structures, the number of the data signal processing chips can be reduced for a low cost. In this case, the first direction 301 is parallel to the data lines of the display panel 10.

In this embodiment, the first sub-pixels 101, the second sub-pixels 102 and the third sub-pixels 103 may be red sub-pixels R, green sub-pixels G and blue sub-pixels B, respectively.

In this embodiment, the patterned retarder film 20 comprises a patterned retarder film body, wherein the patterned retarder film body comprises at least two phase retarders (first phase retarders 201 and second phase retarders 202). The at least two phase retarders are arranged along the first direction 301. That is, the patterned retarder film body comprises a patterned retarder array with the first phase retarders 201 and second phase retarders 202 arranged along the first direction 301.

The phase retarders include first saw portions and second saw portions, and the first saw portions and the second saw portions are disposed at two opposite sides of the phase retarders, and a shape of the first saw portions correspond to a shape of the second saw portions. The first saw portions and the second saw portions are adjacent to at least one of the first sub-pixels 101, at least one of the second sub-pixels 102 and at least one of the third sub-pixels 103. Each adjacent two of the phase retarders are connected to each other Adjacent two of the phase retarders can be a positive quarter phase (¼λ) retarder and a negative quarter phase (−¼λ) retarder.

A first edge of the first saw portions and a second edge of the second saw portions are arranged in a stepped shape.

The first edge and the second edge both include at least two steps, and one of the steps corresponds to one of the first sub-pixels 101, the second sub-pixels 102 and the third sub-pixels 103. That is, one of the steps only overlaps one of the first sub-pixels 101, the second sub-pixels 102 and the third sub-pixels 103. Therefore, the first edge and the second edge can periodically correspond to the first sub-pixels 101, the second sub-pixels 102 and the third sub-pixels 103, but not correspond to at least two adjacent and identical sub-pixels (the first sub-pixels 101, the second sub-pixels 102 and the third sub-pixels 103). For example, the first edge and the second edge can periodically and sequentially correspond to the first sub-pixels 101 (red sub-pixels R), the third sub-pixels 103 (blue sub-pixels B) and the second sub-pixels 102 (green sub-pixels G). Alternatively, the first edge and the second edge can periodically and sequentially correspond to the second sub-pixels 102 (green sub-pixels G), the third sub-pixels 103 (blue sub-pixels B) and the first sub-pixels 101 (red sub-pixels R).

In this embodiment, the steps corresponding to the first edge and the second edge are continuous. That is, the height of the steps is continuously incremented or continuously decremented along a second direction 302. Furthermore, the height of the steps is periodically incremented or decremented. In this case, the second direction 302 is perpendicular to the first direction 301. A height difference between each adjacent two of the steps is less than or Identical to a height or width of one sub-pixel (the first sub-pixel 101, the second sub-pixel 102 or the third sub-pixel 103). That is, the height difference between each adjacent two of the steps can be of the height or width of only one sub-pixel (the first sub-pixel 101, the second sub-pixel 102 or the third sub-pixel 103).

A gap is formed between each two of the first sub-pixels 101, the second sub-pixels 102 and the third sub-pixels 103, and the first edge and the second edge can be positioned in the gap.

The gap between the sub-pixels can correspond to a black matrix (BM) of the display panel 10. That is, the first edge and the second edge can overlap at least a portion of the black matrix. Therefore, the phase retarder can completely cover at least one of the first sub-pixels 101, the second sub-pixels 102 and the third sub-pixels 103, but not only a portion of the at least one of the first sub-pixels 101, the second sub-pixels 102 and the third sub-pixels 103, thereby preventing an image crosstalk phenomenon.

Figure 4:
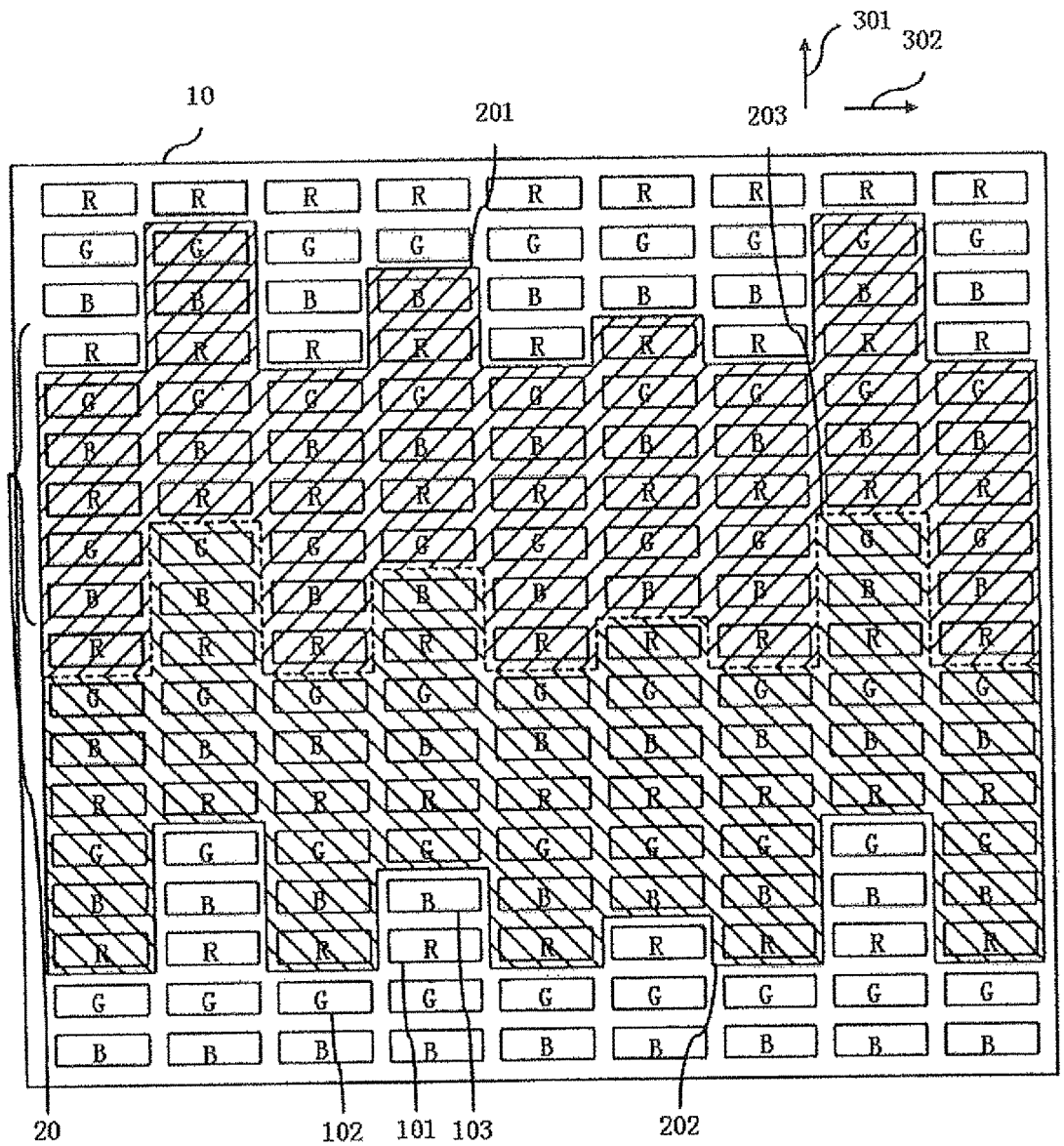
FIG. 4 is a schematic diagram showing a display apparatus according to a second embodiment of the present invention.

Referring to FIG. 4, a schematic diagram showing a display apparatus according to a second embodiment of the present invention is illustrated. The second embodiment is similar to the first embodiment, and the differences therebetween are explained in further detail below.

In this embodiment, the steps corresponding to the first edge and the second edge are discontinuous. That is, the height of the steps is leaping incremented or leaping decremented along a second direction 302. Furthermore, the height of the steps is periodically incremented or decremented. In this case, the second direction 302 is perpendicular to the first direction 301. The height difference between each adjacent two of the steps is larger than to the height or width of one sub-pixel (the first sub-pixel 101, the second sub-pixel 102 or the third sub-pixel 103). That is, the height difference between each adjacent two of the steps can be of the height or width of at least one sub-pixel (the first sub-pixel 101, the second sub-pixel 102 or the third sub-pixel 103).

At least two steps are formed on the first edge and the second edge, and the steps correspond to at least one of the first sub-pixels 101, the second sub-pixels 102 and the third sub-pixels 103. That is, one of the steps covers at least one sub-pixel (the first sub-pixel 101, the second sub-pixel 102 or the third sub-pixel 103). Therefore, the first edge and the second edge can periodically correspond to the first sub-pixels 101, the second sub-pixels 102 and the third sub-pixels 103, but not correspond to at least two adjacent and identical sub-pixels (the first sub-pixels 101, the second sub-pixels 102 and the third sub-pixels 103). That is, each adjacent three of the sub-pixels (the first sub-pixels 101, the second sub-pixels 102 and the third sub-pixels 103) are different. Therefore, the color shift problem of the display can be prevented for improving a 3D display quality.

The present invention has been described above with a preferred embodiment thereof, and it is understood that many changes and modifications to the described embodiment can be carried out without departing from the scope and the spirit of the invention that is intended to be limited only by the appended claims.

The invention claimed is:

1. A patterned retarder film for being attached to a display panel, wherein the display panel comprises at least two of the first sub-pixels, at least two of the second sub-pixels and at least two of the third sub-pixels, and the at least two of the first sub-pixels, at least two of the second sub-pixels and at least two of the third sub-pixels are arranged along a longitudinal direction, and the patterned retarder film comprises:

a patterned retarder film body, comprising at least two phase retarders, wherein the at least two phase retarders are arranged along the longitudinal direction, and each of the phase retarders include top saw portions and bottom saw portions, and the top saw portions and the bottom saw portions are disposed at two opposite sides of each of the phase retarders, and a shape of the top saw portions corresponds to a shape of the bottom saw portions; wherein the top saw portions and the bottom saw portions include a plurality of horizontal surfaces where adjacent horizontal surfaces have different height and at least two non-adjacent horizontal surfaces have the same height; wherein the horizontal surfaces of the top saw portions form a wave shape with at least one peak and at least one trough; the horizontal surfaces of the bottom saw portions form a wave shape with at least one peak and at least one trough;

wherein the top saw portions and the bottom saw portions are adjacent to at least one of the first sub-pixels, at least one of the second sub-pixels and at least one of the third sub-pixels;

wherein adjacent two of the phase retarders are a positive quarter phase retarder and a negative quarter phase retarder;

wherein each adjacent two of the phase retarders are connected to each other without crisscrossing each other.

2. The patterned retarder film according to claim 1, wherein a top edge of the top saw portions and a bottom edge of the bottom saw portions are arranged in a stepped shape.

3. The patterned retarder film according to claim 2, wherein at least two steps are formed on the top edge of the top saw portions and the bottom edge of the bottom saw portions, and the steps correspond to at least one of the first sub-pixels, the second sub-pixels and the third sub-pixels.

4. The patterned retarder film according to claim 3, wherein a gap is formed between each two of the first sub-pixels, the second sub-pixels and the third sub-pixels, and the top edge of the top saw portions and the bottom edge of the bottom saw portions can be positioned in the gap.

5. The patterned retarder film according to claim 3, wherein the steps on top edge of the top saw portions and the bottom edge of the bottom saw portions are arranged in a wave manner.

6. A patterned retarder film for being attached to a display panel, wherein the display panel comprises at least two of the first sub-pixels, at least two of the second sub-pixels and at least two of the third sub-pixels, and the at least two of the first sub-pixels, at least two of the second sub-pixels and at least two of the third sub-pixels are arranged along a longitudinal direction, and the patterned retarder film comprises:
   a patterned retarder film body, comprising at least two phase retarders, wherein the at least two phase retarders are arranged along the longitudinal direction, and the phase retarders include top saw portions and bottom saw portions, and the top saw portions and the bottom saw portions are disposed at two opposite sides of the phase retarders, and a shape of the top saw portions corresponds to a shape of the bottom saw portions; wherein the top saw portions and the bottom saw portions include a plurality of horizontal surfaces where adjacent horizontal surfaces have different height and at least two non-adjacent horizontal surfaces have the same height; wherein the horizontal surfaces of the top saw portions form a wave shape with at least one peak and at least one trough; the horizontal surfaces of the bottom saw portions form a wave shape with at least one peak and at least one trough;
   wherein the top saw portions and the bottom saw portions are adjacent to at least one of the first sub-pixels, at least one of the second sub-pixels and at least one of the third sub-pixels;
   wherein each adjacent two of the phase retarders are connected to each other without crisscrossing each other.

7. The patterned retarder film according to claim 6, wherein adjacent two of the phase retarders are a positive quarter phase retarder and a negative quarter phase retarder.

8. The patterned retarder film according to claim 7, wherein a top edge of the top saw portions and a bottom edge of the bottom saw portions are arranged in a stepped shape.

9. The patterned retarder film according to claim 8, wherein at least two steps are formed on the top edge of the top saw portions and the bottom edge of the bottom saw portions, and the steps correspond to at least one of the first sub-pixels, the second sub-pixels and the third sub-pixels.

10. The patterned retarder film according to claim 9, wherein a gap is formed between each two of the first sub-pixels, the second sub-pixels and the third sub-pixels, and the top edge of the top saw portions and the bottom edge of the bottom saw portions can be positioned in the gap.

11. The patterned retarder film according to claim 9, wherein the steps on top edge of the top saw portions and the bottom edge of the bottom saw portions are arranged in a wave manner.

12. A display apparatus, comprising:
   a display panel; and
   a patterned retarder film attached to the display panel;
   wherein the display panel comprises at least two of the first sub-pixels, at least two of the second sub-pixels and at least two of the third sub-pixels, and the at least two of the first sub-pixels, at least two of the second sub-pixels and at least two of the third sub-pixels are arranged along a longitudinal direction, and the patterned retarder film comprises:
   a patterned retarder film body, comprising at least two phase retarders, wherein the at least two phase retarders are arranged along the longitudinal direction, and the phase retarders include top saw portions and bottom saw portions, and the top saw portions and the bottom saw portions are disposed at two opposite sides of the phase retarders, and a shape of the top saw portions corresponds to a shape of the bottom saw portions; wherein the top saw portions and the bottom saw portions include a plurality of horizontal surfaces where adjacent horizontal surfaces have different height and at least two non-adjacent horizontal surfaces have the same height; wherein the horizontal surfaces of the top saw portions form a wave shape with at least one peak and at least one trough; the horizontal surfaces of the bottom saw portions form a wave shape with at least one peak and at least one trough;
   wherein the top saw portions and the bottom saw portions are adjacent to at least one of the first sub-pixels, at least one of the second sub-pixels and at least one of the third sub-pixels;
   wherein each adjacent two of the phase retarders are connected to each other without crisscrossing each other.

13. The display apparatus according to claim 12, wherein adjacent two of the phase retarders are a positive quarter phase retarder and a negative quarter phase retarder.

14. The display apparatus according to claim 13, wherein a top edge of the top saw portions and a bottom edge of the bottom saw portions are arranged in a stepped shape.

15. The display apparatus according to claim 14, wherein at least two steps are formed on the top edge of the top saw portions and the bottom edge of the bottom saw portions, and the steps correspond to at least one of the first sub-pixels, the second sub-pixels and the third sub-pixels.

16. The display apparatus according to claim 15, wherein a gap is formed between each two of the first sub-pixels, the second sub-pixels and the third sub-pixels, and the top edge of the top saw portions and the bottom edge of the bottom saw portions can be positioned in the gap.

17. The display apparatus according to claim 15, wherein the steps on top edge of the top saw portions and the bottom edge of the bottom saw portions are arranged in a wave manner.

* * * * *